Dec. 1, 1964 F. S. PEDDLE, JR 3,159,339
VISUAL FLIGHT REGULATIONS NAVIGATOR
Filed March 6, 1962 2 Sheets-Sheet 2
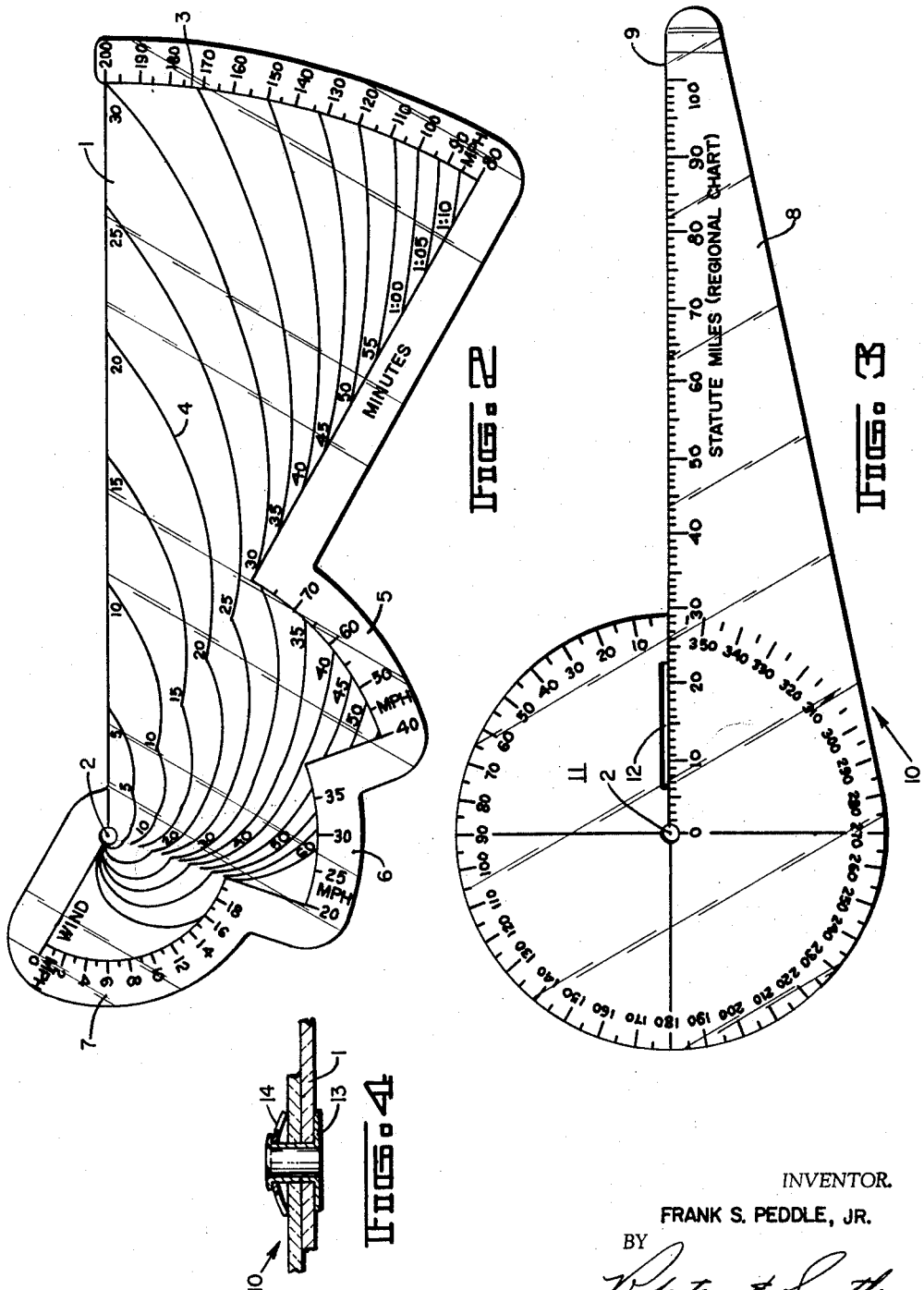
INVENTOR.
FRANK S. PEDDLE, JR.
BY
*Robertson F. Smythe*
ATTORNEYS.

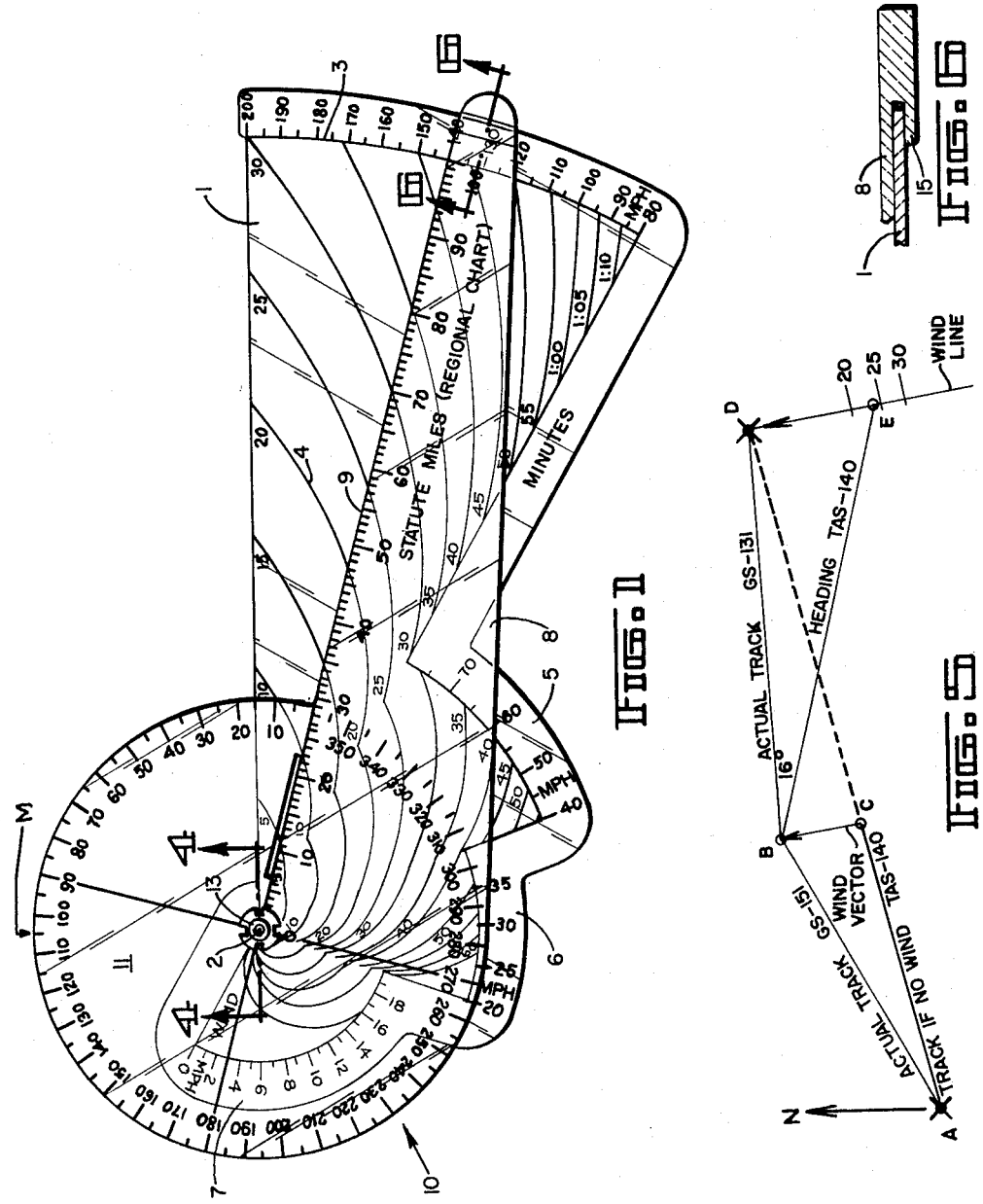

United States Patent Office 3,159,339
Patented Dec. 1, 1964

3,159,339
VISUAL FLIGHT REGULATIONS NAVIGATOR
Frank S. Peddle, Jr., Eagle Springs Road, Oxford, Miss.
Filed Mar. 6, 1962, Ser. No. 177,812
4 Claims. (Cl. 235—61)

The invention relates to instruments of navigation, with special reference to direct-reading course, time and distance plotters for use with aeronautical charts by pilots flying under "Visual Flight Regulations" (V.F.R.)

My V.F.R. navigator is intended for the use of the private pilot whose chief mode of navigation is based on direct observation and timing of the landmarks over which he flies. Since conditions in flight which determine his position at any given time may change, the pilot is interested in providing himself with on-the-spot information concerning his actual progress en route. He wishes to know his ground speed and predict his E.T.A. over landmarks which can be identified on a chart. It is difficult to accomplish this by the usual methods with reasonable accuracy and fly the plane at the same time. He must (1) check times of passage over two landmarks (check-points), (2) subtract the times, (3) measure from his chart the distance between them, (4) use his computer to determine his estimated ground speed, (5) measure from his chart the distance to the next check-point or destination, (6) refer to the computer to find the time to these points, (7) then add these times to the time he passed the last check-point. All the time he must hold his plane on a reasonably constant course, altitude and speed so that the estimates he makes can be reliable.

Use of my V.F.R. navigator with a wrist watch simplifies the procedure by eliminating subtraction of times, measurements of distances and the use of the computer. The instrument comprises a pair of flat transparent "read-through" members pivoted together one above the other so as to furnish relative angular adjustment between them. By reason of the particular form of the two members and the special coordinate relationship of the time, speed, distance and compass bearings indicia, faster and simpler solutions are realized for a variety of common flight problems met by the solo flight navigator.

One of the flat transparent members is a time-speed indicator and the other a course-distance indicator. The time-speed indicator comprises a segment having a time scale consisting of a set of curves plotted on polar coordinates to give uniform increments of time along any of a number of selected lines extending radially from the pivot or center point, such time scale beginning with zero time at the center point and increasing in a radially outward direction. The time-speed indicator also has a speed scale along a circumferential line. The course-distance indicator comprises an arm portion having a distance scale coordinator with the time and speed scales, such distance scale extending radially from the center point beginning with zero at the center point and increasing in a radially outward direction.

In my preferred construction the time-speed indicator includes one or more additional segments, each having a time scale consisting of a set of curves plotted in the manner of the curves referred to above, such additional segment or segments having a wind speed scale along a circumferential line or lines. When the instrument comprises a number of such additional segments, it is advantageous to have the circumferential lines of the several wind speed scales located at different radial distances from the center point. My preferred construction further includes a bearing protractor formed as a part of the course-distance indicator.

My navigational instrument may further be described in brief summary as including, in combination, a time-speed indicator comprising a flat transparent member in the general form of a segment of a circle having speed indicia along the arc of circumference and time indicia oriented to the center of the arc, and a course-distance indicator comprising a flat transparent member having a radial arm in juxtaposition with the segment of the time-speed indicator, this radial arm having a straight edge whose projection intersects the center of the arc of the time-speed indicator, the two indicators being secured together for relative angular movement about such center. With reference to the accompanying drawings, I shall now describe the best mode contemplated by me for carrying out my invention.

FIG. 1 is a face view of my V.F.R. navigator.

FIG. 2 is a similar view of the time-speed indicator member of the instrument of FIG. 1.

FIG. 3 is a similar view of the course-distance (and bearing) indicator member of the instrument of FIG. 1.

FIG. 4 is an enlarged detail cross-sectional view taken as indicated at 4—4 in FIG. 1.

FIG. 5 is a plot of wind triangles such as would be constructed on a chart with the use of my navigator to solve wind problems.

FIG. 6 is an enlarged detail cross-sectional view taken as indicated at 6—6 in FIG. 1.

The time-speed indicator shown in FIG. 2 comprises a main segment 1 in the general form of a segment of a circle scribed from the center point 2. Along an arc 3 of this segment is a speed scale in miles per hour. Coordinated with this speed scale is a set of time curves 4 plotted on polar coordinates to give uniform increments of time along any of a number of selected lines extending radially from the center point 2 beginning with zero time at the center point and increasing in a radially outward direction, the curves here shown being plotted at 5 minute intervals from zero to 1 h. 10 m. In the particular embodiment shown, the course-distance indicator includes three additional segments 5, 6 and 7, each having a time scale consisting of a set of curves plotted in the manner of the curves 4. Each of these additional segments has a wind speed scale along a circumferential line. These circumferential lines are here shown as being located at progressively shorter radial distances from the center 2, affording the most favorable angular disposition of the curves for easy reading of the instrument while achieving a high degree of compactness in the instrument for ease of handling.

My V.F.R. navigator is a transparent, "read-through" device which superimposes a time scale on an aeronautical chart. The time-scale is calibrated in minutes so that an estimated time of arrival (E.T.A.) can be directly read for any position along a course-line drawn on a chart having a standard scale, such as the sectional or world chart scales of conventional aeronautical charts. The plotter can be positioned so that any time-scale within a convenient range of speeds can be immediately employed. The actual time-scale constitutes the intersections of the curved time lines 4 with a course line such as the course marked by the edge of the protractor arm in FIG. 1. The distance along the course line between the curved time-lines varies as the angle of the time-lines is changed. Hence the time-scale may be adjusted for speed. Each time-line, when plotted on polar coordinates, is represented by the following formula:

$$r = \frac{tk}{60} \theta$$

Where: $r$ = radius (position on mileage scale)
$\theta$ = angle of rotation in degrees from zero m.p.h. position on the speed scale
$k$ = speed scale constant (m.p.h. per degree). The product of $k$ and $\theta$ represents the position on the speed scale.
$t$ = number of minutes represented by the time-line being plotted. The formula indicates that each time-line is of the form of a simple, first-order spiral.

The navigator may be constructed for any standard scale, range of speeds, or units of speed or distance, as follows:

(1) Outline the desired dimensions on a clear plastic sheet, thick enough so that it will not be too flexible (about 1/20 of an inch). Lines and figures may be etched and filled with some opaque substance. As we have seen, the principal arm 1 is as made in the shape of a segment of a circle. A convenient angle for this segment is about 30°. The radius of the segment is determined by the desired length of the course line to be covered. In FIGS. 1 and 2, the radius is equal to 100 miles on a *world aeronautical chart*. A segment of twice the radius would be constructed on the basis of 100 miles on a *sectional chart*.

(2) Select the range of speeds over which the time-scale can be set. In the drawings the range from 80 to 200 m.p.h. is evenly distributed over 30°, giving a scale constant ($k$) of 4 m.p.h. per degree. Place a mark every 2½° along the periphery of the segment. These marks represent 10 m.p.h. intervals on the speed scale starting with 80 m.p.h. at the bottom. The speed scale may be subdivided further for more accurate reading.

(3) Begin constructing time-lines by marking along the lower radial the positions reached at 5, 10, 15, etc. minutes of travel at 100 m.p.h., according to the scale of the chart being used.

(4) Repeat the procedure for each radial representing 110, 120, 130, etc. m.p.h. This produces a series of points for times 5, 10, 15, etc. minutes, each of which describes a segment of a spiral according to the formula given in paragraph 1.

(5) Join the marks with a French curve to produce the spiral time-lines. Greater accuracy of reading may be obtained by similarly constructing lighter time-lines for each minute between the 5-minute intervals.

(6) The wind sections 5, 6 and 7 are constructed in similar manner.

The course-distance indicator 10, FIG. 3, comprises an arm portion 8 having a distance scale coordinated with the time and speed scales of FIG. 2 and extending along a straight edge 9, which is aligned radially with the center point 2. The distance scale begins with zero at the center point and increases in a radially outward direction. In the preferred construction here shown, the course-distance indicator includes a bearing protractor 11 having a counterclockwise scale of degrees around the center point 2 beginning with zero degrees at the line of the radially extending distance scale, i.e. the line of the straight edge 9 of the protractor arm. Protractor 11 has an opening 12 presenting a straight edge aligned with the aforesaid straight edge 9 adapted to receive the point of a pencil.

Resuming with the instructions for constructing the navigator, we may now proceed to the next step;

(7) Mark off the correct distance-scale on the separate piece of clear plastic which is to form the member 10, FIG. 3. The bearing protractor 11, or compass rose may be included with its center 2 at the zero end of the distance scale with the degrees reading in the counterclockwise direction as previously noticed.

(8) The members 1 and 10 are provided with circular apertures at the center points 2 thereof. The member 10 of FIG. 3 is superimposed on the member 1 of FIG. 2 with these apertures in alignment, and the two members are secured together for relative angular movement about center 2 by means of a hollow rivet 13 which may be provided with a spring washer 14 so that after the two members are adjusted to a particular setting, they will be held in light frictional engagement to preserve the adjustment while being easily rotated relative to one another for settings of any desired speed.

The intersections of the time lines with the distance scale (or with a course line), is the time-scale for the speed indicated. The distance scale indicates distances along the course line, and any meridian passing through the apex indicates the course at the top of the compass rose.

If desired the end of the arm 8 of the course-distance indicator may be formed with a hooked end 15 as shown in FIG. 6.

*Use of the V.F.R. Navigator to Determine E.T.A.*

To determine estimated time of arrival at a particular check-point or destination, the pilot sets his watch at zero minutes as he crosses his initial check-point after stabilizing his course and speed in level flight. Then he notes the time at which he passes over a second check-point—say about ten minutes later. He places the center point 2 of the instrument over the first check-point on the chart, adjusts the device so that the time-scale 4 indicates the observed time of passage over the second check-point, then reads directly from the chart his E.T.A. at any point along the distance scale or course line. If he is interested, he may read directly his estimated ground speed which is automatically indicated by the intersection of his course line with the speed scale on the navigator. The mileage scale enables distances to be read directly from the chart. Inclusion of the compass rose or bearing protractor 11 enables him to plot course lines and measure the actual course (track) over which he is moving. The mileage scale also enables the pilot to use the navigator as a time-distance-speed computer without reference to a chart.

The pilot may continue to check his actual progress along the course line by noting the times at which he crosses each of a series of check-points. Each successive adjustment of the time-scale gives him an improved E.T.A., either by averaging minor errors of measurement and variations of his course and speed, or by indicating a major change in his progress due to a shift in the wind, in which case he simply reestimates his E.T.A. by putting the center point 2 on the last check-point taken and making a new reading on the next.

*Use of the V.F.R. Navigator to Estimate Position Upon Loss of Visual Contact With the Ground*

The pilot may also use the navigator to estimate his position in the event he loses visual contact with the ground. If he suspects that he has strayed from his course line and can only tune in one OMNI range which is off to the side, he may plot the two radials that he crosses at the beginning and end of some five-minute interval. By moving the navigator so that the time-scale (distance scale set on estimated speed) remains approximately parallel with the course line and so that any pair of five-minute marks (a five-minute interval) on the time scale intersect the two radials on the chart, his estimated position will be indicated immediately. Thus the complex procedure of getting a "running-fix" is reduced to the drawing of two lines and matching them with two points on the plotter.

*Use of the Navigator To Solve Problems of Wind and Drift*

The V.F.R. navigator may also be used to solve wind problems with direct reference to the chart. The following procedures may be employed:

(*a*) To determine prevailing direction and velocity of the wind, use the navigator on the first two check-points as outlined above. See points A and B in FIG. 5. Use of the navigator indicates that you are actually moving on a track of 060 degrees. Since you arrived at B at time :16 min. (A is time :0), your ground speed reads 151 m.p.h., the compass rose indicates that you are off course 15° to the left. Direct inspection suggests a tentative shift of course 30° to the right requiring a reestimate of the ground speed. However, at this point, an estimate of the wind can be made as follows. Set true airspeed on the speed scale. With center 2 at A, line up distance scale on true heading. Mark chart at time :16 min. on the time scale. Since the airspeed was 140 m.p.h. and the true heading was 075°, time :16 min. occurs at point C. Thus the line from A to C would be the actual track if there were no wind and the line from C to B indicates the direction of the motion of the air (the wind vector). Setting the time-scale with 0 at C and time :16 at B, intersection of straight edge 9 with the speed scale of segment 5 gives the velocity of the wind (41 m.p.h.) on the wind scale.

(b) To estimate course to steer when the wind conditions are known, draw the intended track line (B to D in FIG. 3). Then draw a wind-line from D in direction from which wind is blowing. Time from B to D on the basis of airspeed (140 m.p.h.) is measured to be 23 minutes, a rough estimate of actual time. Since time will actually be longer, use the time-scale set at wind velocity 41 m.p.h. and mark off points along wind line for 20, 25 and 30 minutes. You now have a wind scale. (See FIG. 5.) Set the time scale for true airspeed (140 m.p.h.) Place vertex on point B and rotate time-scale down the wind-scale until the reading of the wind-scale agrees with the reading of the time-scale at the edge of the arm. This occurs at 24½ min. at point E. The line from B to E describes the heading and indicates a crab angle of 16°. Since the E.T.A. at point D is time 24½ min., setting this time for D when vertex is on B indicates a ground speed of 131 m.p.h.

From the foregoing description of several examples of the use of my V.F.R. navigator, it will be understood that this device makes it possible to superimpose a time-scale directly on the chart being used to indicate estimated time of arrival and ground speed by direct inspection. It is also possible to remove the device from the chart without losing the speed setting on the time-scale. Interpolation by eye between the curved time lines 4 is aided by the favorable angle of intersection between these lines and the course lines, particularly at the higher speeds where the time lines are farther apart. Divisions along the speed scale are equally spaced, giving readings of equal accuracy throughout the range of speeds, reducing the angle of the segment necessary to afford accurate readings and facilitating visual interpolation.

Further, the navigator I have disclosed has the advantage of permitting instant readings of the E.T.A. at any point along the course line, and necessary corrections on the time-scale automatically correct the indicated E.T.A.'s and ground speed. Finally my navigator combines in one instrument the coordinate functions of a protractor type plotter, time-distance-speed computer, and an adjustable read-through time-scale, while also making possible the quick solution of wind problems by direct reference to the pilot's chart.

If desired, additional scales may be provided to adapt the instrument for use with charts of different distance scales as will be readily understood.

The terms and expressions which I have employed are used in a descriptive and not a limiting sense, and I have no intention of excluding equivalents of the invention described and claimed.

I claim:

1. In a navigational instrument, a pair of superimposed flat transparent members secured together for relative angular movement about a center point, one of said members being a time-speed indicator and the other a course-distance indicator, the time-speed indicator comprising a segment having a time scale consisting of a set of curves plotted on polar coordinates to give uniform increments of time along any of a number of selected lines extending radially from said center point, said time scale beginning with zero time at the center point and increasing in a radially outward direction and further having a speed scale along a circumferential line, and the course-distance indicator comprising an arm portion having a distance scale coordinated with the time and speed scales, said distance scale extending radially from said center point beginning with zero at the center point and increasing in a radially outward direction, the time-speed indicator includes at least one additional segment having a time scale consisting of a set of curves plotted in the manner of the first-named set of curves and further having a wind speed scale along a circumferential line.

2. A navigational instrument according to claim 1 in which the time-speed indicator includes a plurality of additional segments each having a time scale consisting of a set of curves plotted in the manner of the first-named set of curves and each additional segment further having a wind speed scale along a circumferential line, the circumferential lines of the several wind speed scales being at different radial distances from said center point and the smaller radial distances being associated with the lower wind scale ranges.

3. A navigational instrument according to claim 1 in which the course-distance indicator includes a bearing protractor having a counterclockwise scale of degrees around said center point beginning with zero degrees at the line of said radially extending distance scale.

4. A navigational instrument according to claim 3 in which said protractor has an opening presenting a straight edge aligned with said radially extending distance scale.

References Cited by the Examiner

UNITED STATES PATENTS

| | | | |
|---|---|---|---|
| 1,528,944 | 3/25 | Newell | 235—61 |
| 2,345,020 | 3/44 | Warner | 33—75 |
| 2,545,935 | 3/51 | Warner | 235—61.02 |
| 3,028,076 | 4/62 | Messmore | 235—61.02 |

LEYLAND M. MARTIN, *Primary Examiner.*

LEO SMILOW, *Examiner.*

UNITED STATES PATENT OFFICE
CERTIFICATE OF CORRECTION

Patent No. 3,159,339                                December 1, 1964

Frank S. Peddle, Jr.

It is hereby certified that error appears in the above numbered patent requiring correction and that the said Letters Patent should read as corrected below.

Column 1, line 54, for "coordinator" read -- coordinated --.

Signed and sealed this 20th day of April 1965.

(SEAL)
Attest:

ERNEST W. SWIDER                                EDWARD J. BRENNER
Attesting Officer                                    Commissioner of Patents